United States Patent [19]

Gradi et al.

[11] Patent Number: 4,596,703

[45] Date of Patent: * Jun. 24, 1986

[54] PROCESS FOR PURIFYING WET-PROCESSED PHOSPHORIC ACID

[75] Inventors: Reinhard Gradi, Hürth; Gero Heymer; Günther Schimmel, both of Erftstadt, all of Fed. Rep. of Germany

[73] Assignee: Hoechst Aktiengesellschaft, Fed. Rep. of Germany

[*] Notice: The portion of the term of this patent subsequent to Dec. 3, 2002 has been disclaimed.

[21] Appl. No.: 557,111

[22] Filed: Dec. 1, 1983

[30] Foreign Application Priority Data

Dec. 15, 1982 [DE] Fed. Rep. of Germany ....... 3246415

[51] Int. Cl.$^4$ ..................... C01B 25/16; C01B 15/16; C01B 25/26
[52] U.S. Cl. ............................... 423/321 S; 423/313; 423/321 R
[58] Field of Search ................ 423/321 R, 321 S, 322, 423/313, 167

[56] References Cited

U.S. PATENT DOCUMENTS

| | | | |
|---|---|---|---|
| 1,929,442 | 10/1933 | Milligan | 423/321 S |
| 3,684,438 | 8/1972 | Gleason | 423/321 S |
| 4,118,462 | 10/1978 | Desire et al. | 423/321 S |
| 4,196,180 | 4/1980 | Wojtech et al. | 423/321 S |

FOREIGN PATENT DOCUMENTS

| | | | |
|---|---|---|---|
| 3127900 | 3/1983 | Fed. Rep. of Germany | 423/321 S |
| 1436113 | 5/1976 | United Kingdom . | |
| 1436114 | 5/1976 | United Kingdom . | |
| 1436115 | 5/1976 | United Kingdom . | |

*Primary Examiner*—Gregory A. Heller
*Attorney, Agent, or Firm*—Connolly and Hutz

[57] ABSTRACT

The disclosure relates to a process for purifying crude, concentrated wet-processed phosphoric acid. To this end, the disclosure provides:

(a) for the organic solvent to be mixed with the starting product in a ratio by volume of more than 4:1 to effect the extraction in a single process step—from the crude wet-processed phosphoric acid—of a quantity of phosphoric acid necessary for 40 to 70 weight % of the $P_2O_5$ used to go into the organic phase, and for the resulting aqueous phosphoric acid raffinate to contain at most 28–32 weight % $P_2O_5$, and for the organic phosphoric acid solution to be separated from the phosphoric acid raffinate;

(b) for the separated organic phosphoric acid solution to be scrubbed with a quantity of scrubbing solution corresponding at most to 5% of the volume of the phosphoric acid solution; for the scrubbing solution to be recycled into stage (a), and for purified phosphoric acid and phosphate salt solution, respectively, to be recovered in known manner from the scrubbed phosphoric acid solution; and (c) for the aqueous phosphoric acid raffinate produced in stage (a), if desired after prior removal of residual solvent therefrom, to be directly utilized or subjected to known purifying treatment.

5 Claims, No Drawings

PROCESS FOR PURIFYING WET-PROCESSED PHOSPHORIC ACID

The present invention relates to a process for purifying wet-processed phosphoric acid by means of an organic solvent being immiscible or only partially miscible with water.

Two kinds of processes have long been known for purifying wet-processed phosphoric acid by extraction. In most cases, attempts have been made to extract phosphoric acid as completely as possible from crude wet-processed phosphoric acid by means of an organic solvent being immiscible or only partially miscible with water. A first group of prior processes, e.g. those described in U.S. Pat. Nos. 3,956,465; 4,222,994 and 4,346,066, are not fully satisfactory however inasmuch as the extraction is effected in a plurality of processing steps and/or use is made of high solvent/acid-ratios and of sulfuric acid as an extraction aid.

More particularly, more or less important quantities of solid matter are deposited in practice with the result that apparatus components become encrusted or clogged.

In addition to this, high $P_2O_5$-yields have considerable adverse effects on the selectivity of the solvent so that heavily contaminated organic extract is obtained for which it is necessary to be subjected to expensive scrubbing treatment comprising a large number of scrubbing stages and the use of large quantities of scrubbing water.

The second group of prior processes is concerned with so-called "splitting processes" which provide for just a certain portion of $P_2O_5$ to be extracted from the wet-processed phosphoric acid which is to be purified, and for remaining raffinate acid presenting a correspondingly higher degree of contamination to be utilized for other purposes.

A typical splitting process has e.g. been described in U.S. Pat. No. 3,318,661, wherein one part by weight crude phosphoric acid containing 48-62 weight % $P_2O_5$ is extracted with 0.5-1.5 parts by weight isopropylether (IPE), whereby about 40% of the $P_2O_5$ goes into the organic solvent.

The remaining 60% of the $P_2O_5$ initially used and the bulk of contaminants form the aqueous raffinate acid which contains about 47-48% $P_2O_5$ and can be used for making fertilizers. The purified phosphoric acid is recovered from the separated isopropylether-extract either by distillatively removing the organic solvent with the resultant formation of phosphoric acid of 85% strength, or by admixing the extract with a quantity of water necessary to effect the separation of an aqueous phosphoric acid solution containing about 48 weight % $P_2O_5$ from the organic phase.

In a narrower sense, this process does not disclose an extraction but a reaction between IPE and $H_3PO_4$ yielding a complex insoluble in the crude acid, which is disadvantageous. It is not possible e.g. to improve the selectivity by the use of a higher solvent/acid-ratio as this would involve formation of a third phase.

This in turn has rendered the operation of commercial production facilities problematic. In addition to this, it is not possible for the organic phase consisting of the IPE/$H_3PO_4$-complex to be scrubbed so that the purified acid admits of limited uses only. A further adverse effect resides in the need for the crude acid to contain at least 54% $P_2O_5$ in order to obtain an at least 40% yield, as compared with the about 50 up to at most 52% $P_2O_5$-content of commercial crude acids. In order to obtain higher yields, e.g. of 60%, it is invariably necessary to use acid with a strength of about 57%. In other words, it would be necessary for the crude acid to be concentrated prior to extracting it.

The present invention now provides an improved process for purifying crude wet-processed phosphoric acid containing more than 45 weight % $P_2O_5$ by contacting the starting product with an organic solvent being immiscible or only partially miscible with water and capable of dissolving phosphoric acid so that merely a portion of the $P_2O_5$ contained in the starting product is absorbed by the solvent and an aqueous phosphoric acid raffinate containing less $P_2O_5$ than the starting product is formed; subsequently separating the formed organic phosphoric acid solution from the phosphoric acid raffinate and scrubbing said solution; recycling scrubbing solution into the process; recovering in known manner purified phosphoric acid or phosphate salt solution (alkali metal or ammonium phosphate) from the scrubbed organic phosphoric acid solution, and utilizing otherwise remaining phosphoric acid raffinate. As has unexpectedly been found, the process just described can be critically improved technically and commercially by the following operations comprising:

(a) mixing the organic solvent with the starting product in a ratio by volume of more than 4:1, preferably 6:1–10:1, and thereby effecting the extraction in a single process step—from the crude wet-processed phosphoric acid—of a quantity of phosphoric acid necessary for 40 to 70 weight %, preferably 50–55 weight % of the $P_2O_5$ used to go on to the organic phase, and for the resulting aqueous phosphoric acid raffinate to contain at most 28–32 weight %, preferably 30–32 weight % $P_2O_5$, and separating the organic phosphoric acid solution from the phosphoric acid raffinate;

(b) scrubbing the separated organic phosphoric acid solution with a quantity of scrubbing solution corresponding at most to 5%, preferably 3,3–2% of the volume of the phosphoric acid solution; recycling the scrubbing solution into stage (a), and recovering in known manner purified phosphoric acid and phosphate salt solution, respectively, from the scrubbed phosphoric acid solution; and (c) directly utilizing or subjecting to known purifying treatment the aqueous phosphoric acid raffinate produced in stage (a), if desired after prior removal of residual solvent therefrom.

As already mentioned, the starting product used in the process of this invention is commercially available crude phosphoric acid containing more than 45 weight % $P_2O_5$. In all those cases in which it is desirable to achieve a high degree of purity, it is good practice to subject this acid to pre-purifying treatment and thereby to free it from its principal contaminant, which is sulfuric acid, and organic compounds.

To this end, the acid is treated in known manner with calcium ions in the presence of active carbon at about 80° C.; via the stage of intermediarily forming calcium sulfate semi-hydrate, pre-purified (commonly green colored) acid is obtained together with a filter cake which consists essentially of gypsum, is obtained in a quantity corresponding to 5–6 weight % of the crude acid, and can readily be disposed of.

Most of the crude acids are normally contaminated with heavy metal ions, such as ions of cadmium, copper, lead and mercury, and also with arsenic ions. The uses the final products are put to, or problems relating to environmental protection or product deposition may make it imperative for these contaminants to be removed or to be specially deposited in concentrated form. In this event, the ions specified should conveniently be removed by the process described in S.A. patent application No. 83/5264 which provides for them to be removed prior to extraction by a simple processing step from the optionally pre-purified acid by subjecting this latter to treatment with a diorganyldithiophosphoric acid ester and an adsorbent. Alternatively, it is also possible to carry out this step after extraction on the phosphoic acid raffinate.

A further process for obtaining pure phosphoric acid, deprived especially of $SO_4$-ions, has e.g. been described in U.S. Pat. No. 4,321,245, which provides for the sulfate ions to be removed by the addition of barium compounds and counter-current extraction in several stages in the presence of sulfuric acid with the aid of solvents being immiscible or only partially miscible with water, and for the phosphoric acid to be recovered from the separated organic extract. The purifying treatment is effected in an extraction zone comprising n-stages, where n is equal to or greater than 5; the barium compound is added to the phosphoric acid which is to be purified and the mixture is admitted near the head of the extraction zone. In addition to this, the organic solvent phase is dispersed in the aqueous phase and the sulfuric acid is caused to travel countercurrently to the phosphoric acid by introducing it into one of the stages ranging from stage 4 to stage n-1.

In the process of this invention, the organic solvent should preferably be cycled and used with that content of water which it has after recovery of the purified phosphoric acid or phosphate salt solution from the organic phosphoric acid solution. Amyl alcohol, preferably amyl alcohol which originates from an oxo-synthesis, should conveniently be used as the organic solvent.

The extraction yield (or splitting ratio) depends on the $P_2O_5$-concentration in the crude acid, the number of stages, the solvent/acid-ratio, and the quantity of recycled scrubbing water. In accordance with this invention, the acid concentration is at least 45 weight % $P_2O_5$ and the extraction is effected in just one stage. Critically determined by the solvent/acid-ratio selected is not only the extraction yield but also the $P_2O_5$-concentration in the organic and aqueous phases. In one case or other, it may be necessary to select a high $P_2O_5$-concentration for the extract and aqueous phase, i.e. to effect the extraction with the use of a small solvent/acid-ratio as described e.g. in British Patent Specifications Nos. 1 436 113 1 436 114 and 1 436 115. In this process, 64.6 to 70 weight % of the $P_2O_5$ is extracted and it is suggested that the extraction should be effected in more than 1 stage. In order to achieve high concentration in a small number of stages. The solvent/acid-ratio is intentionally kept very low, namely at 1.2–1.4:1. The selection of a ratio greater than specified is said to have adverse affects, namely to require the use of large-dimensioned reactors.

The very poor selectivity of the solvent which is the result of the low solvent/acid-ratio selected is indeed a considerable adverse effect of this prior process.

Incidentally, this is the reason why a heavily contamined extract is obtained. Base on $P_2O_5$, the organic extract contains just about 63 weight % less iron than the crude acid. It is therefore an imperative requirement for this extract to be scrubbed in several stages with a large quantity of purified phosphoric acid. The ratio of extract to scrubbing acid selected is between 2 and 4:1. In the event of the scrubbing acid used being pure acid coming from the re-extraction stage, it is necessary for 25–46 weight % of the resulting acid to be recycled. Needless to say this is a procedure which adversely affects a good deal of phosphoric acid already purified.

Despite this heavy operative expenditure, the resulting acid has a moderate degree of purity only.

In addition to this, an aqueous phase containing 40 to 47 weight % $P_2O_5$ is obtained during the extraction. Bearing in mind that concentrated crude phosphoric acids normally contain at least 50 weight % $P_2O_5$, while crude phosphoric acids made by the dihydrate process contain about 30 weight % $P_2O_5$, it is necessary for these aqueous residues to be diluted or concentrated for further use.

In accordance with this invention, it has been found advantageous to effect the extraction with the use of a high solvent/acid-ratio at the price of a low $P_2O_5$-concentration in the organic phase since the solvent's selectivity is in this way unexpectedly less heavily affected by cations. In this manner, it is possible for more than 90% of cationic contaminants (based e.g. on the iron content) to be deconcentrated from the crude acid to the organic extract. Acid recoverable from such extract has a purity sufficient for certain uses. Where higher demands are being made as to the purity of the acid, it is possible for this extract to be scrubbed in 1 to 3 stages. To this end, it is sufficient to use a very small quanity of water corresponding to about 1/30 of the crude extract volume so that the resulting scrubbed raffinate, which can be recycled into the extraction stage, practically presents the same $P_2O_5$-concentration as the aqueous phase formed during the extraction. The re-extraction of phosphoric acid from the organic phase can be effected in known manner using water or an aqueous alkaline liquor, purified acid being obtained in the first case and an alkali metal phosphate solution in the second. The quantitative ratios of water or alkaline liquor to extract phase should be so selected that the entire phosphoric acid goes from the organic into the aqueous phase. Prior to putting the resulting purified acid and alkali metal phosphate solution, respectively, to the intended uses, the solvent dissolved therein should conveniently be removed therefrom, e.g. by stripping with steam, or recovered.

The raffinate acid coming in accordance with this invention from the extraction stage contains between 30 and 60%, preferably between 45 and 50%, of the crude $P_2O_5$ used, in a concentration of at least 28%, preferably 30 to 32% $P_2O_5$. This is exactly the concentration of $P_2O_5$ in that crude acid which is obtained on subjecting phosphate ore to processing treatment with sulfuric acid by the dihydrate process, and which finds use as starting product in standard methods for purification by precipitation.

The following Example illustrates the invention.

Commercially available crude acid prepared from North-Africa phosphate, with the following composition (all numerical data in weight %) was used in the following experiments:

| $P_2O_5$ | 50.3 | Fe | 0.27 | Cr | 0.011 |
|---|---|---|---|---|---|
| $SO_4$ | 2.6 | Al | 0.12 | As | 0.0008 |
| $C_{org.}$ | 0.048 | Mg | 0.71 | V | 0.015 |

| | | | | | | |
|---|---|---|---|---|---|---|
| F | 0.32 | Zn | 0.025 | Cd | 0.0011 | |

100 kg of this acid was initially heated to about 80° C. and mixed successively with 0.3 kg active carbon and 2.14 kg calcium hydroxide. Next, the mixture was stirred for about 50 minutes and filtered off on a presure filter. The filter cake was scrubbed with 10 l hot water and the scrubbed filtrate was combined with the primary filtrate. The resulting pre-purified acid was composed as follows (weight %):

| | | | | | |
|---|---|---|---|---|---|
| $P_2O_5$ | 47.6 | Fe | 0.26 | Cr | 0.010 |
| $SO_4$ | 0.43 | Al | 0.11 | As | 0.0007 |
| $C_{org.}$ | 0.009 | Mg | 0.67 | V | 0.014 |
| F | 0.3 | Zn | 0.024 | Cd | 0.0010 |

1000 g of this pre-purified acid was heated to 70° C., admixed with 1.5 g bis(2-ethylhexyl)dithiophosphoric acid ester, and the whole was stirred for about 30 minutes. Next, the mixture was cooled to 35° C. and 10 g perlite was added. After stirring for a further 30 minutes, the mixture was filtered off. The phosphoric acid was free from thioester and contained less than 0.0001% each of Cd and As.

In the following experiments, use was however made of the pre-purified acid containing cadmium and arsenic.

In a mixer/settler-unit, 1666.3 g/h of this acid and 256.2 g/h recycled scrubbed raffinate previously admixed with 10 g barium carbonate through the acid feed line, were extracted simultaneously with the use of 5826.1 g/h water-saturated amyl alcohol; the aqueous phase was continuously cycled and the organic phase was dispersed therein. 6530 g/h organic extract which contained 7.34% $P_2O_5$ and 0.0033% iron, and 1218 g/h aqueous residue with the composition indicated below were obtained. The organic extract was scrubbed countercurrently with water in a volume ratio of 30:1 (organic/aqueous) in a three stage mixer/settler-unit and ultimately re-extracted in an extraction column provided with rotating structural parts, in a volume ratio of 6:1 (organic/aqueous). The resulting pure acid was concentrated up to a $P_2O_5$-content of about 60%.

The pure acid was composed as follows:

| | | | | | |
|---|---|---|---|---|---|
| $P_2O_5$ | 59.7 | Fe | 0.0001 | Cr | <0.0001 |
| $SO_4$ | 0.04 | Al | <0.0001 | As | 0.0004 |
| $C_{org}$ | 0.05 | Mg | <0.0001 | V | 0.0001 |
| F | 0.01 | Zn | <0.0001 | Cd | <0.0001 |

The aqueous phase (1218 g/h) obtained during the extraction contained 393.4 g/h $P_2O_5$. This corresponded to 48.5% of the crude $P_2O_5$; in other words, the yield was 51.5%. The raffinate acid was composed as follows (weight %):

| | | | | | |
|---|---|---|---|---|---|
| $P_2O_5$ | 32.3 | Fe | 0.36 | Cr | 0.016 |
| $SO_4$ | 0.17 | Al | 0.15 | As | 0.0002 |
| F | 0.3 | Mg | 0.92 | V | not identified |
| Amyl alc. | 0.3 | Zn | 0.033 | Cd | 0.0018 |

This acid was introduced into the head end portion of a packed column, freed from dissolved and suspended alcohol by the introduction of steam into the base of the column, the composition of the acid and its $P_2O_5$-content remaining practically unchanged.

We claim:

1. A splitting process for purifying crude wet-process phosphoric acid containing a 45–54 weight % $P_2O_5$ content, consisting essentially of the steps:

(a) contacting the feed wet-process phosphoric acid with an organic solvent which is immiscible or only partially miscible with water and is capable of dissolving phosphoric acid so that at most 40 to 70 weight % of phosphoric acid is extracted by mixing the organic solvent with the said acid in a ratio by volume of more than 4:1 in a single process step, with the resulting formation of a plurality of phases between which the said $P_2O_5$ content is split:

an organic extract phase containing at most 40 to 70 weight % of said $P_2O_5$ content, an aqueous raffinate phase containing essentially the remaining phosphoric acid residue, the concentration of $P_2O_5$ in said aqueous raffinate phase being at most 28–32 weight % $P_2O_5$;

and separating subsequently the organic extract phase from the aqueous raffinate phase;

(b) scrubbing the separated organic extract phase with a quantity of an aqueous medium corresponding to at most 5% of the volume of the phosphoric acid extract; recycling the scrubbing solution formed into stage (a); recovering from the scrubbed phosphoric acid extract either purified phosphoric acid by reextracting the extract with water or recovering a purified alkali metal phosphate solution by reextracting the extract with an alkaline solution.

2. The process as claimed in claim 1, wherein wet-process phosphoric acid is extracted to such an extent that the said aqueous raffinate phase contains 30–32 weight % $P_2O_5$.

3. The process as claimed in claim 1, wherein the organic solvent is mixed with the feed wet-process phosphoric acid in a ratio by volume of 6:1 to 10:1.

4. The process as claimed in claim 1, wherein the separated organic extract phase is scrubbed with a quantity of the aqueous medium corresponding to 3.3–2% of the volume of the organic extract phase.

5. The process as claimed in claim 1, wherein the feed wet-process phosphoric acid is mixed with the organic solvent so that 50–55 weight % of the $P_2O_5$ content is extracted into the resulting organic extract phase.

* * * * *